United States Patent
Sasaki et al.

(10) Patent No.: US 12,415,572 B2
(45) Date of Patent: Sep. 16, 2025

(54) VEHICLE BODY REAR STRUCTURE

(71) Applicant: HONDA MOTOR CO., LTD., Tokyo (JP)

(72) Inventors: Takuya Sasaki, Tokyo (JP); Toshihiro Yamaguchi, Tokyo (JP); Kyosuke Yamakita, Tokyo (JP); Takashi Nitta, Tokyo (JP); Dai Kamata, Tokyo (JP); Yusuke Miura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 378 days.

(21) Appl. No.: 18/113,631

(22) Filed: Feb. 24, 2023

(65) Prior Publication Data

US 2023/0278639 A1    Sep. 7, 2023

(30) Foreign Application Priority Data

Mar. 3, 2022  (JP) ................................ 2022-032902

(51) Int. Cl.
| | | |
|---|---|---|
| *B62D 25/08* | (2006.01) | |
| *B62D 25/20* | (2006.01) | |
| *B62D 43/10* | (2006.01) | |

(52) U.S. Cl.
CPC .............. *B62D 25/08* (2013.01); *B62D 25/20* (2013.01); *B62D 43/10* (2013.01)

(58) Field of Classification Search
CPC .... B62D 21/152; B62D 25/08; B62D 25/087; B62D 25/20; B62D 43/06; B62D 43/10
See application file for complete search history.

(56) References Cited

U.S. PATENT DOCUMENTS

| | | | |
|---|---|---|---|
| 2011/0156431 A1* | 6/2011 | Souma | B62D 21/152 296/37.2 |
| 2018/0050734 A1 | 2/2018 | Olsson et al. | |

FOREIGN PATENT DOCUMENTS

| | | |
|---|---|---|
| CN | 116691849 | 9/2023 |
| JP | 05-178240 | 7/1993 |
| JP | 09-002336 | 1/1997 |
| JP | 11-011359 | 1/1999 |
| JP | 2004-181998 | 7/2004 |

(Continued)

OTHER PUBLICATIONS

JPH10316050A (Dec. 1998).*

(Continued)

*Primary Examiner* — Lori Lyjak
(74) *Attorney, Agent, or Firm* — Amin, Turocy & Watson, LLP

(57) ABSTRACT

A vehicle body rear section includes a rear floor pan (11), a floor pan reinforcement member (20), and a towing load receiving section. The rear floor pan (11) has an upper surface to which the spare tire (16) is fixed. The floor pan reinforcement member (20) is fixed to a lower surface of the rear floor pan (11). The towing load receiving section protrudes downward from a rear section of the rear floor pan (11). The floor pan reinforcement member (20) extends at least partially from a support position of the towing load receiving section toward a front side of a fixed position of the spare tire (16). An easy-deformable portion (22) with lower bending strength than that of front and rear regions is provided in front of the fixed position of the spare tire (16) in a reinforcement region of the rear floor pan (11).

6 Claims, 3 Drawing Sheets

(56) References Cited

FOREIGN PATENT DOCUMENTS

| | | |
|---|---|---|
| JP | 2007-276605 | 10/2007 |
| JP | 2011-111026 | 6/2011 |
| JP | 2020-059365 | 4/2020 |

OTHER PUBLICATIONS

WO 2013047266 A1 (Apr. 2013).*
Chinese Office Action for Chinese Patent Application No. 202310043770.3 mailed Jul. 21, 2025.

* cited by examiner

VEHICLE BODY REAR STRUCTURE

CROSS-REFERENCE TO RELATED APPLICATION

Priority is claimed on Japanese Patent Application No. 2022-032902, filed Mar. 3, 2022, the content of which is incorporated herein by reference.

BACKGROUND OF THE INVENTION

Field of the Invention

The present invention relates to a vehicle body rear structure in which an accommodating section of a spare tire is provided on a rear section of a vehicle body floor.

Description of Related Art

As a vehicle body rear structure, rear floor pan configured to accommodate a spare tire horizontally provided on a rear section of a vehicle body floor is known. In such a vehicle body rear structure, when an impact load is input from the rear of the vehicle, there is concern of the spare tire on the rear floor pan moving forward and interfering with a member on the side of a passenger compartment.

As a countermeasure, a vehicle body rear structure in which a rear section of a spare tire that receives an impact load is lifted upward when the impact load is input from the rear of the vehicle has been proposed (for example, see Patent Document 1 (Japanese Unexamined Patent Application, First Publication No. 2011-111026)).

In the vehicle body rear structure disclosed in Patent Document 1, a hook reinforcement member for a towing hook is attached to a center of a lower surface of a rear floor pan in a vehicle width direction. The hook reinforcement member is configured to be divided into a reinforcement member front section and a reinforcement member rear section, and a towing hook is fixed to a lower surface of the reinforcement member rear section on the side of a rear end.

In the vehicle body rear structure, when an impact load is input from the rear of the vehicle, the hook reinforcement member is bent to protrude downward together with the rear floor pan about a division boundary portion between the reinforcement member front section and the reinforcement member rear section. Accordingly, a front section of the spare tire fixed on the rear floor pan while inclined slightly forward drops downward, and as a result, the rear section of the spare tire is lifted upward significantly.

SUMMARY OF THE INVENTION

In the vehicle body rear structure disclosed in Patent Document 1, when an impact load is input from the rear of the vehicle, the hook reinforcement member and the rear floor are bent to protrude downward, and thus the rear section of the spare tire is lifted upward. For this reason, when a rear panel of the vehicle body rear section facing the tire accommodating section collapses forward early upon input of the impact load from the rear of the vehicle, the lift-up of the rear section of the spare tire is suppressed by the rear panel, and a desired behavior of the spare tire cannot be easily obtained.

Here, the present invention is directed to provide a vehicle body rear structure capable of stably suppressing movement of a spare tire in a direction of a passenger compartment upon input of an impact load from the rear of a vehicle. Therefore, the present invention will eventually contribute to development of a sustainable transportation system.

A vehicle body rear structure according to the present invention employs the following configuration in order to solve to the above-mentioned problems.

(1) A vehicle body rear structure according to an aspect of the present invention includes a rear floor pan on which a spare tire is disposed horizontally on the side of an upper surface and to which a central portion of the spare tire is fixed; a floor pan reinforcement member fixed to a lower surface of the rear floor pan; and a towing load receiving section protruding downward from a rear section of the rear floor pan via the floor pan reinforcement member, the floor pan reinforcement member extends at least partially from a support position of the towing load receiving section toward a front side of a fixed position of the spare tire in a vehicle, and an easy-deformable portion with lower bending strength than front and rear regions is provided on a front side of the fixed position of the spare tire in a reinforcement region of the rear floor pan by the floor pan reinforcement member.

According to the aspect of the above-mentioned (1), when an impact load is input from the rear of the vehicle in the vicinity of the vehicle body load receiving section protruding downward from the rear section of the rear floor pan, the load is applied to the easy-deformable portion of the rear floor pan as a bending moment through the floor pan reinforcement member. Accordingly, the rear floor pan is bent to protrude upward about the easy-deformable portion together with the floor pan reinforcement member. Here, since the easy-deformable portion is located in front of the fixed position of the spare tire, the front section of the spare tire lifts upward early along with the above-mentioned bending deformation of the rear floor pan. As a result, even when the member on the side of the vehicle rear section such as the rear panel or the like deforms and abuts the spare tire, a lift-up behavior of the front section of the spare tire is not restricted, and movement of the spare tire in a direction of a passenger compartment is suppressed stably.

(2) In the vehicle body rear structure according to the aspect of the above-mentioned (1), the floor pan reinforcement member may include: a load support block having a rear lower end to which the towing load receiving section is connected and a front end portion extending forward from the fixed position of the spare tire in the vehicle; and a front reinforcement block fixed to a position on the lower surface of the rear floor pan separated forward from the front end portion of the load support block, and a part of the rear floor pan between the load support block and the front reinforcement block may constitute the easy-deformable portion.

According to the aspect of the above-mentioned (2), since the part of the rear floor pan between the load support block and the front reinforcement block, which are separated in the forward/rearward direction, becomes the easy-deformable portion, in comparison with the case in which the easy-deformable portion is formed on the continuous load support block, the structure of the load support block can be simplified. When this configuration is employed, a deformation behavior of the easy-deformable portion can be easily set and adjusted by changing the fixed position of the front reinforcement block to the rear floor pan.

(3) In the vehicle body rear structure according to the aspect of the above-mentioned (2), a ridge portion protruding upward may be provided on the part of the rear floor pan between the load support block and the front reinforcement block in a vehicle width direction.

According to the aspect of the above-mentioned (3), when the impact load is input from the rear of the vehicle, the part of the rear floor pan between the load support block and the front reinforcement block is bent to protrude upward about the ridge portion. Accordingly, when this configuration is employed, upon input of the impact load from the rear of the vehicle, the front section of the spare tire is lifted earlier, and movement of the spare tire in the direction of the passenger compartment can be suppressed more stably.

(4) In the vehicle body rear structure according to the aspect of the above-mentioned (2), a restriction block configured to restrict excessive forward displacement of the front reinforcement block from a front side of the front reinforcement block of the rear floor pan as an origin may be provided on the upper surface of the rear floor pan disposed in front of the front reinforcement block or the upper surface of the floor panel coupled to the front edge portion of the rear floor pan.

According to the aspect of the above-mentioned (4), upon input of the impact load from the rear of the vehicle, the rear floor pan is bent to protrude upward about the easy-deformable portion, and thus, when the front reinforcement block is displaced forward from the front side as an origin, the fixing portion of the rear floor pan to the front reinforcement block abuts the restriction block. As a result, it is possible to suppress the front reinforcement block from being displaced forward excessively and the front edge portion of the rear floor pan or the floor panel from being deformed downward. Accordingly, when this configuration is employed, it is possible to prevent a large impact load from being applied to parts such as a fuel tank and the like disposed below the floor panel or below the front region of the rear floor pan.

(5) In the vehicle body rear structure according to the aspect of the above-mentioned (4), the restriction block may have a high rigidity portion with higher rigidity than another area, which is provided in a central region in the vehicle width direction.

According to the aspect of the above-mentioned (5), upon input of the impact load from the rear of the vehicle, when the fixing portion of the rear floor pan to the front reinforcement block abuts the restriction block, rigidity of the central region of the restriction block in the vehicle width direction to which a load of the spare tire is most greatly applied increases. As a result, deformation of the restriction block by the input of the impact load can be suppressed, and parts disposed below the floor panel or the front region of the rear floor pan can be protected more reliably.

(6) In the vehicle body rear structure according to the aspect of the above-mentioned (1), an auxiliary bumper member protruding backward from the towing load receiving section in the vehicle may be attached to the rear section of the floor pan reinforcement member.

According to the aspect of the above-mentioned (6), when an impact load is input from another object from the behind of the vehicle, the load can be received in the vicinity of the towing load receiving section early through the auxiliary bumper member. For this reason, when this configuration is employed, upon input of the impact load from the rear of the vehicle, the bending deformation about the easy-deformable portion of the rear floor pan and the lift-up behavior of the front section of the spare tire according to this can be obtained early.

In the vehicle body rear structure according to the present invention, at least the part of the floor pan reinforcement member extends from the support position of the towing load receiving section to the side in front of the fixed position of the spare tire in the vehicle, and the easy-deformable portion is provided at the side in front of the fixed position of the spare tire in the reinforcement region of the rear floor pan by the floor pan reinforcement member. For this reason, upon input of the impact load from the rear of the vehicle, the rear floor pan is bent to protrude upward about the easy-deformable portion together with the floor pan reinforcement member, and the front section of the spare tire is lifted upward early. Accordingly, when the vehicle body rear structure according to the present invention is employed, upon input of the impact load from the rear of the vehicle, movement of the spare tire in the direction of the passenger compartment can be suppressed stably.

DETAILED DESCRIPTION OF THE INVENTION

Hereinafter, an embodiment of the present invention will be described with reference to the accompanying drawings. Further, in appropriate places of the drawings, an arrow FR indicates a forward direction of a vehicle 1, an arrow UP indicates an upward direction of the vehicle 1, and an arrow LH indicates a leftward direction of the vehicle 1.

Figure 1:
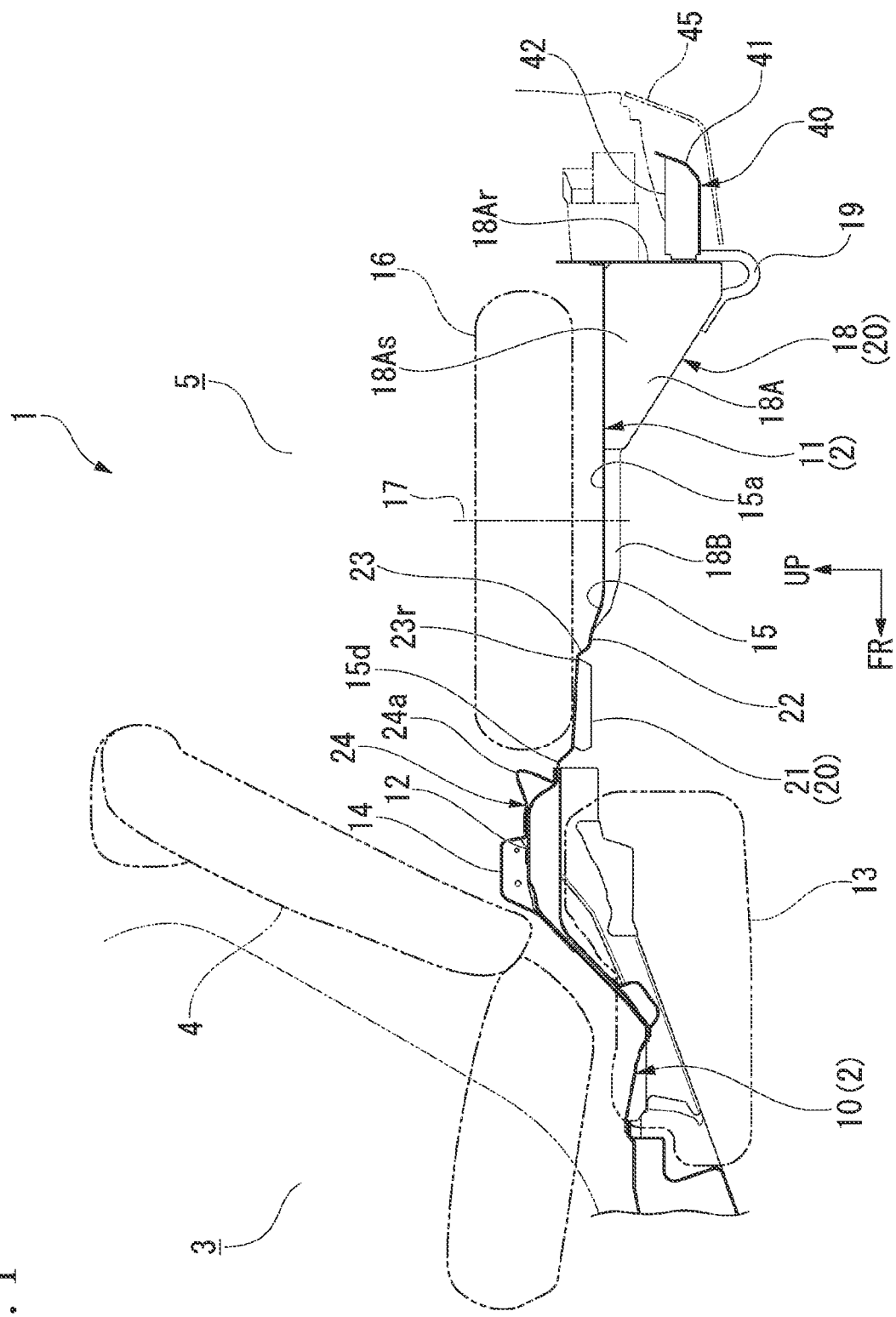
FIG. 1 is a longitudinal cross-sectional view of a vehicle body rear section of an embodiment.
Figure 2:
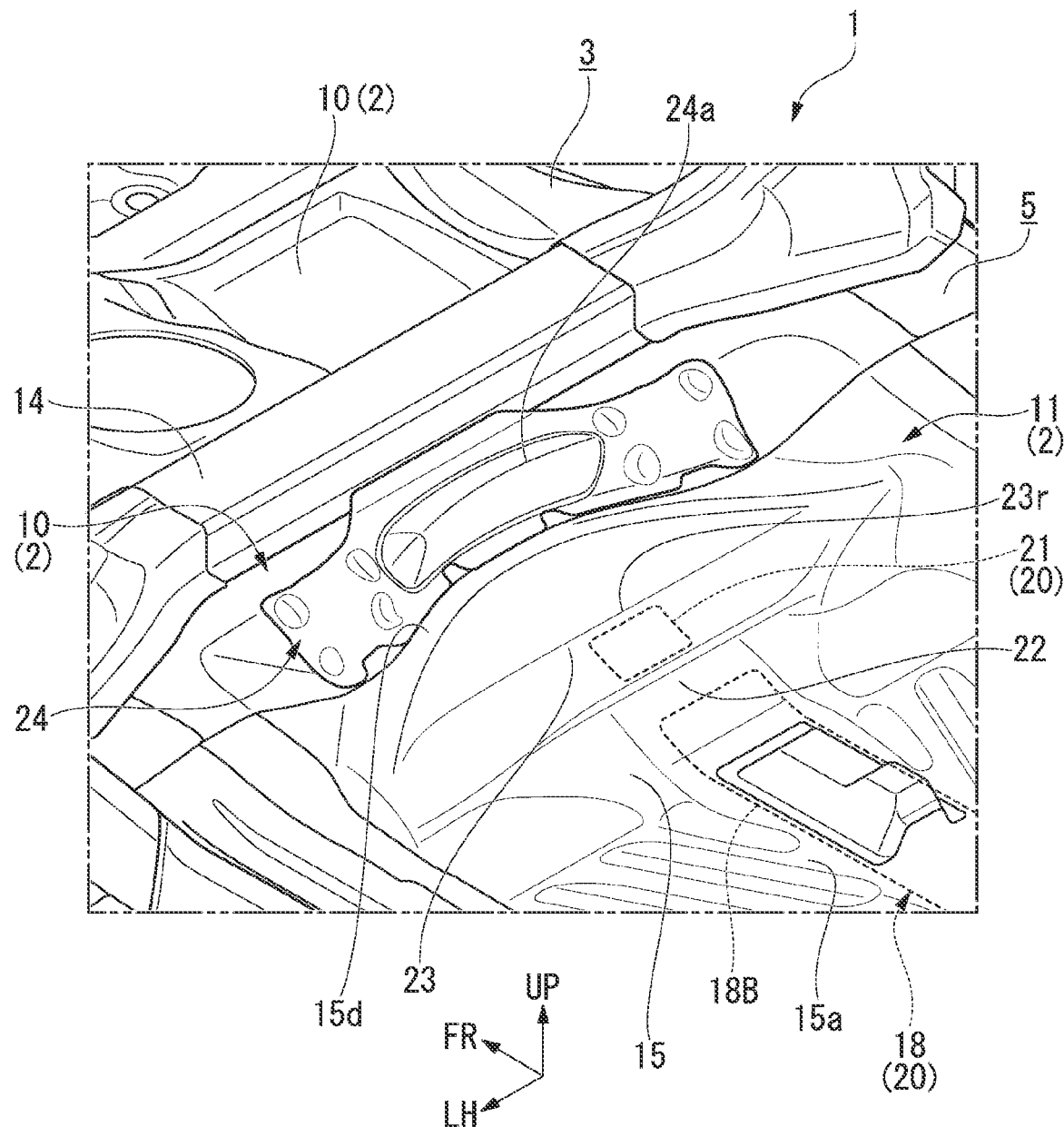
FIG. 2 is a perspective view of the vehicle body rear section of the embodiment.

FIG. 1 is a longitudinal cross-sectional view showing substantially a center of a vehicle body rear section of the vehicle 1 of the embodiment in a vehicle width direction. FIG. 2 is a perspective view of the vehicle body rear section of the vehicle 1 from behind an upper left side diagonally.

A vehicle body floor 2 has a floor panel 10 disposed below a passenger compartment 3, and a rear floor pan 11 disposed below the cargo compartment 5 behind the passenger compartment 3. The floor panel 10 is coupled to a front edge portion of the rear floor pan 11. Side sills (not shown) extending in a vehicle body forward/rearward direction are disposed on both left and right sides of the floor panel 10. The floor panel 10 bridges between the left and right side sills. Rear side frames (not shown) extending substantially in the vehicle body forward/rearward direction are disposed on both left and right sides of the rear floor pan 11. The rear floor pan 11 bridges between the left and right rear side frames.

As shown in FIG. 1, a rear seat 4 is installed on the side of the upper surface of the floor panel 10. A kick-up portion 12 slightly increased rearward in a stepped shape is provided closer to the rear section than an installation portion of the rear seat 4 of the floor panel 10. A fuel tank 13 is installed below the kick-up portion 12 of the floor panel 10. A rear cross member 14 extending substantially in the vehicle width direction is adhered to the kick-up portion 12 on the side of the upper surface. Left and right end portions of the rear cross member 14 are connected to left and right rear side frames (not shown).

The rear floor pan 11 has a tire accommodating section 15 having a substantially circular shape recessed downward. A spare tire 16 is accommodated in the tire accommodating section 15 horizontally. A tire fixing portion (not shown) is installed at substantially a center of a bottom wall 15a of the tire accommodating section 15. A substantially central portion of the spare tire 16 is fixed to the tire fixing portion by a fixing tool (not shown). Further, reference sign 17 in FIG. 1 is a center axis of the spare tire 16 fixed to the rear floor pan 11. The center axis 17 passes through a fixed position of the spare tire 16 on the rear floor pan 11.

A stepped wall 15d higher than the bottom wall 15a of the tire accommodating section 15 is provided on a front edge portion of the tire accommodating section 15 of the rear floor pan 11. The front edge portion of the stepped wall 15d overlaps and is coupled to a rear edge portion of the kick-up portion 12 of the floor panel 10. A rear end portion of the stepped wall 15d constitutes a substantially arc-shaped circumferential edge portion of the front upper end of the tire accommodating section 15.

A load support block 18 that is a part of a floor pan reinforcement member 20 is attached to a substantially central position of the lower surface of the tire accommodating section 15 of the rear floor pan 11 in the vehicle width direction. A hook member 19 that is a towing load receiving section is attached to a rear lower end of the load support block 18. The hook member 19 is formed of a metal rod having substantially a U shape when seen in a side view, and both end portions of the metal rod are coupled to a rear lower end of the load support block 18. The hook member 19 has a substantially U-shaped curved portion bulging downward from the rear lower end of the load support block 18 while being fixed to the load support block 18. The hook member 19 can lock a hook of a towing rope (not shown) to a substantially U-shaped curved portion upon towing of the vehicle.

The load support block 18 includes a metal base block portion 18A constituted by a box body having a substantially trapezoidal shape when seen in a side view, and a metal extension block portion 18B extending from the front end portion of the base block portion 18A toward the front of the vehicle.

The base block portion 18A includes a rear wall 18Ar extending downward vertically from the rear end portion of the rear floor pan 11, and left and right sidewalls 18As having substantially a trapezoidal shape when seen in a side view. The left and right sidewalls 18As have rear side extending along the rear wall 18Ar in the vertical direction, short lower sides extending forward substantially horizontally from lower ends of the rear sides, forward inclined sides extending forward and upward diagonally from front end portions of the lower sides, short front sides extending upward vertically from front end portions of the forward inclined sides, and upper sides that connect upper ends of the front sides and the rear sides. The upper sides, the forward inclined sides, and the front sides of the left and right sidewalls are connected to each other.

The extension block portion 18B is formed to have substantially the same width as the base block portion 18A and connected to the front end portion of the base block portion 18A (portions corresponding to the front sides of the left and right sidewalls 18As). The extension block portion 18B constitutes a closed cross section extending in the vehicle forward/rearward direction between the rear floor pan 11 and the extension block portion 18B, for example, by connecting long metal plates having a hat-shaped cross-sectional shape to the lower surface of the rear floor pan 11.

While the load support block 18 to which the base block portion 18A and the extension block portion 18B are connected is provided in the embodiment, the load support block 18 may be constituted by one continuous part.

The load support block 18 configured as described above extends from the vicinity of the rear end portion of the rear floor pan 11 (the support position of the hook member 19) toward a position in front of a fixed position (17) of the spare tire 16 to the vehicle and behind the front end portion of the spare tire 16 in the vehicle at a central position of the lower surface of the rear floor pan 11 in the vehicle width direction.

A front reinforcement block 21 that constitutes the floor pan reinforcement member 20 together with the load support block 18 is fixed to a position on the lower surface of the rear floor pan 11 separated forward from the front end portion of the load support block 18 by a predetermined distance. The front reinforcement block 21 is constituted by, for example, a metal plate having a hat-shaped cross-sectional shape. The front reinforcement block 21 forms a closed cross section together with the lower surface of the rear floor pan 11 by being adhered to the lower surface of the rear floor pan 11.

Further, the front reinforcement block 21 is disposed below the stepped wall 15d of the front edge portion of the tire accommodating section 15 of the rear floor pan 11 and on the rear side of the vehicle.

As described above, a central region of the rear floor pan 11 in the vehicle width direction is reinforced by the floor pan reinforcement member 20 constituted by the load support block 18 and the front reinforcement block 21. The reinforcement region of the rear floor pan 11 by floor pan reinforcement member 20 has no reinforcement member between the load support block 18 and the front reinforcement block 21, and has bending strength lower than that of front and rear regions. In the embodiment, a region in the rear floor pan 11 between the load support block 18 and the front reinforcement block 21 becomes an easy-deformable portion 22.

The easy-deformable portion 22 becomes a bending origin when the front region of the rear floor pan 11 is bent to protrude upward by the input of the impact load from the rear of the vehicle.

A stepped portion 23 with a higher front side is formed in an area located on the bottom wall 15a of the tire accommodating section 15 of the rear floor pan 11 between the fixing portions of the load support block 18 and the front reinforcement block 21. An upper corner of the stepped portion 23 configures a ridge portion 23r that protrudes upward and extends substantially in the vehicle width direction.

A reinforcement plate 24 is attached to an upper surface of a rear edge portion of the kick-up portion 12 of the floor panel 10. The reinforcement plate 24 is constituted by a metal plate with high rigidity and disposed in a forward region of the tire accommodating section 15 in the rear edge portion of the kick-up portion 12. A bulging portion 24a that bulges upward from the rear section is formed in a central region of the reinforcement plate 24 in the vehicle width direction. In the reinforcement plate 24, since the bulging portion 24a has a shape that bulges to protrude upward from the rear section, rigidity of the central region in the vehicle width direction is greater than that of another area.

Here, it is considered that, upon input of the impact load from the rear of the vehicle, when the rear floor pan 11 is bent to protrude upward from the easy-deformable portion 22 as an origin and a pressing load from the rear of the vehicle is increased, the front reinforcement block 21 is displaced forward more than necessity on the side of the front end portion as an origin. Here, a fixing region of the rear floor pan 11 to the front reinforcement block 21 abuts the bulging portion 24a of the reinforcement plate 24 (see FIG. 3C). Accordingly, excessive forward displacement of the front reinforcement block 21 is controlled by the reinforcement plate 24. As a result, deformation of an upper region of the fuel tank 13 of the floor panel 10 by the impact load applied to the front reinforcement block 21 is suppressed.

In the embodiment, the reinforcement plate 24 constitutes the restriction block and the bulging portion 24a of the reinforcement plate 24 constitutes a high rigidity portion of the restriction block.

As shown in FIG. 1, an auxiliary bumper member 40 protruding rearward from the hook member 19 of the vehicle that is a towing load receiving section is attached to the rear wall 18Ar of the load support block 18. The auxiliary bumper member 40 includes a metal load receiving plate 41 extending to be curved rearward and upward after extending substantially horizontally rearward from a portion of the vehicle near a lower end of the rear wall 18Ar of the load support block 18, and also a metal reinforcement plate 42 configured to reinforce the load receiving plate 41. The load receiving plate 41 receives an impact load from the rear of the vehicle in the rear end region extending to be curved rearward and upward. The reinforcement plate 42 is adhered to the rear wall 18Ar of the load support block 18 and the load receiving plate 41 and forms a box shape together with the rear wall 18Ar and the load receiving plate 41.

Further, reference sign 45 in FIG. 1 is a rear bumper of the vehicle. The rear end region of the load receiving plate 41 is formed substantially along a shape of the rear section of the rear bumper 45. That is, in the rear end region of the load receiving plate 41, the upper side is located closer to the rear side of the vehicle than the lower side.

Figure 3A:
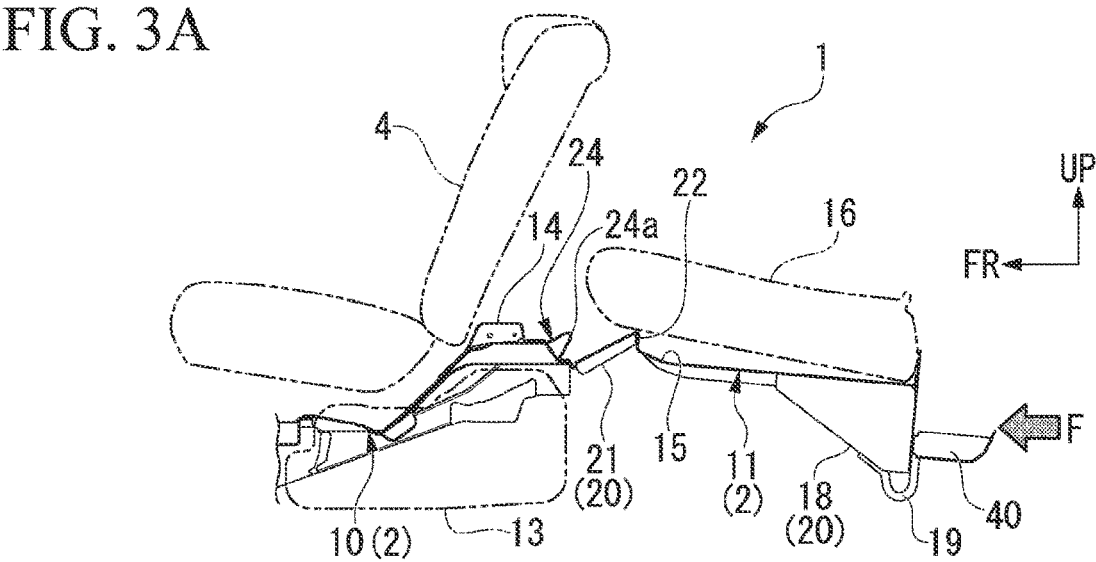
FIG. 3A is a cross-sectional view showing a deformation behavior of the vehicle body rear section of the embodiment.
Figure 3B:
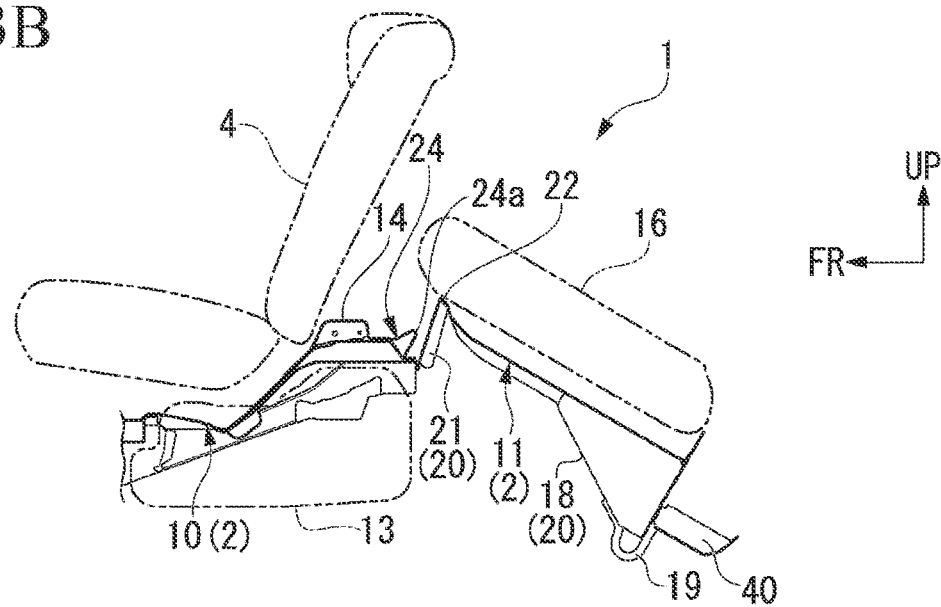
FIG. 3B is a cross-sectional view showing a deformation behavior of the vehicle body rear section of the embodiment.
Figure 3C:
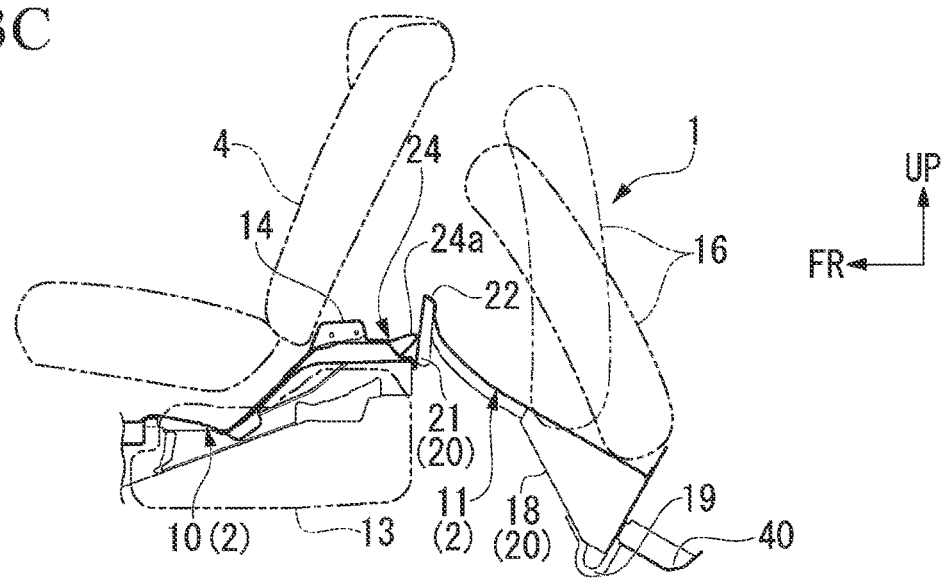
FIG. 3C is a cross-sectional view showing a deformation behavior of the vehicle body rear section of the embodiment.

FIG. 3A to FIG. 3C are cross-sectional views sequentially showing deformation behaviors of the vehicle body rear section when an impact load is input from the rear of the vehicle.

Hereinafter, the deformation behaviors of the vehicle body rear section upon input of the impact load will be described with reference to FIG. 3A to FIG. 3C.

As shown in FIG. 3A, when a large impact load F is input from the rear of the vehicle, while the impact load F collapses the vehicle body rear end side, a portion of the rear lower end of the load support block 18 near the hook member 19 is pressed forward through the auxiliary bumper member 40. Here, the load input to the rear lower end of the load support block 18 through the auxiliary bumper member 40 acts as a moment about the easy-deformable portion 22 of the load support block 18 on the side of the front end.

Accordingly, as shown in FIG. 3B, the rear floor pan 11 is bent to protrude upward from the easy-deformable portion 22 located in front of a central position of the spare tire 16 as an origin. Here, the spare tire 16 gradually lifts up the front end portion along with the rear region from the easy-deformable portion 22 of the rear floor pan 11.

When the impact load F continues to be input from the rear of the vehicle, bending deformation with the origin at the easy-deformable portion 22 of the rear floor pan 11 progresses further. Accordingly, as shown in FIG. 3C, the front reinforcement block 21 of the rear floor pan 11 on the side of the lower surface rises and receives the pressing force from the front edge portion of the load support block 18. Here, the fixing region of the rear floor pan 11 to the front reinforcement block 21 on the side of the front section abuts the bulging portion 24a of the reinforcement plate 24 of the front edge of the tire accommodating section 15 of the rear floor pan 11. Accordingly, excessive forward displacement of the front reinforcement block 21 is restricted. As shown in FIG. 3C, the front end portion of the spare tire 16 rises upward as the rising behavior of the load support block 18 progresses.

As a result, the movement of the spare tire 16 in the direction of the passenger compartment is suppressed, and the impact load input by the collapse deformation of the vehicle body rear region is absorbed. After the front of the spare tire 16 was flipped up, the rear of the spare tire 16 is caught between the floor pan 11 and the rear panel of the cargo compartment 5, and thus, it is possible to suppress violent movement of the spare tire 16 (an impact on the rear seat 4 due to excessive flipping or the like).

As described above, in the vehicle body rear structure of the embodiment, a part (the load support block 18) of the floor pan reinforcement member 20 extends from the support position of the hook member 19 to the side in front of the fixed position of the spare tire 16 in the vehicle. Then, the easy-deformable portion 22 is provided on the front side of the fixed position of the spare tire 16 in the reinforcement region of the rear floor pan 11 by the floor pan reinforcement member 20. For this reason, upon input of the impact load from the rear of the vehicle, the rear floor pan 11 is bent to protrude upward about the easy-deformable portion 22 together with the floor pan reinforcement member 20, and the front section of the spare tire 16 is lifted upward early.

Accordingly, when the vehicle body rear structure of the embodiment is employed, upon input of the impact load from the rear of the vehicle, movement of the spare tire 16 in the direction of the passenger compartment 3 can be stably suppressed. Then, accordingly, it is possible to improve safety of the vehicle and contribute to development of a sustainable transportation system.

In the vehicle body rear structure of the embodiment, the floor pan reinforcement member 20 fixed to the lower surface of the rear floor pan 11 includes the load support block 18, and the front reinforcement block 21 disposed to be separated from the front side of the load support block 18. Then, in the load support block 18, the hook member 19 is fixed to the rear lower end, and the front end portion extends from the fixed position of the spare tire 16 on the front side of the vehicle. In the vehicle body rear structure of the embodiment, a region of the rear floor pan 11 with no reinforcement member disposed between the load support block 18 and the front reinforcement block 21 constitutes the easy-deformable portion 22. For this reason, in comparison with the case in which the easy-deformable portion is formed on the continuous load support block, the structure of the load support block 18 can be simplified.

When the vehicle body rear structure of the embodiment is employed, the deformation behavior of the easy-deformable portion 22 can be easily set and adjusted by appropriately changing the fixed position of the front reinforcement block 21 to the rear floor pan 11.

In the vehicle body rear structure of the embodiment, the ridge portion 23r protruding upward is provided in the region of the rear floor pan 11 between the load support block 18 and the front reinforcement block 21 substantially in the vehicle width direction. For this reason, upon input of the impact load from the rear of the vehicle, the easy-deformable portion 22 on the rear floor pan 11 is easily bent to protrude upward about the ridge portion 23r protruding upward.

Accordingly, when the vehicle body rear structure of the embodiment is employed, upon input of the impact load from the rear of the vehicle, the front section of the spare tire 16 can be lifted upward more early, and movement of the spare tire 16 in the direction of the passenger compartment can be suppressed more stably.

Further, in the vehicle body rear structure of the embodiment, the reinforcement plate 24 that constitutes the restriction block is attached to the upper surface of the rear region (the kick-up portion 12) of the floor panel 10 disposed in front of the front reinforcement block 21. Then, the reinforcement plate 24 restricts excessive forward displacement of the front reinforcement block 21 according to the bending deformation from the easy-deformable portion 22 of the rear floor pan 11 as an origin upon input of the impact load from the rear of the vehicle. For this reason, it is possible to suppress the front reinforcement block 21 from excessive forward displacement and downward deformation of the rear region (the kick-up portion 12) of the floor panel.

Accordingly, when the vehicle body rear structure of the embodiment is employed, it is possible to prevent a large impact load from being applied to a part such as the fuel tank 13 or the like disposed below the rear region of the floor panel 10.

Further, in the embodiment, while the reinforcement plate 24 that constitutes the restriction block is fixed to the upper surface of the rear region of the floor panel 10, the reinforcement plate 24 may be fixed to the upper surface of the front region of the rear floor pan 11 according to the structure of the floor section of the vehicle body. The restriction block is not limited to the reinforcement plate 24 constituted by a plate member and may be a solid block member.

In the vehicle body rear structure of the embodiment, the bulging portion 24a is provided in the central region of the reinforcement plate 24 that constitutes the restriction block in the vehicle width direction, and the bulging portion 24a constitutes a high rigidity portion having higher rigidity than that of another area. For this reason, upon input of the impact load from the rear of the vehicle, in the central region to which the load of the spare tire 16 is largely applied in the vehicle width direction, an input load from the front reinforcement block 21 can be received by the bulging portion 24a of the reinforcement plate 24 with high rigidity.

Accordingly, when the configuration is employed, deformation of the reinforcement plate 24 by the input of the impact load can be suppressed, and parts such as the fuel tank 13 or the like disposed below the rear region of the floor panel 10 can be more reliably protected.

In the vehicle body rear structure of the embodiment, the auxiliary bumper member 40 protruding rearward from the hook member 19 of the vehicle is attached to a downward portion of the rear section of the floor pan reinforcement member 20. For this reason, when the impact load is input from another object behind the vehicle, the load can be received in the vicinity of the hook member 19 of the rear section early through the auxiliary bumper member 40.

Accordingly, when the configuration is employed, upon input of the impact load from the rear of the vehicle, bending deformation of the rear floor pan 11 about the easy-deformable portion 22 and the lift-up behavior of the front section of the spare tire 16 according to this can be obtained early.

Further, the present invention is not limited to the above-mentioned embodiment and various design changes may be made without departing from the spirit of the present invention.

In the embodiment, the load support block 18 and the front reinforcement block 21 are separated and fixed to the lower surface of the rear floor pan 11 in the forward/rearward direction, and the region between the load support block 18 and the front reinforcement block 21 of the rear floor pan 11 becomes the easy-deformable portion 22. However, the configuration of the easy-deformable portion 22 is not limited thereto. For example, the floor pan reinforcement member 20 may be constituted by the block continuous in the forward/rearward direction, and an easy-bendable deformation portion such as a thin wall portion or the like may be provided in a part of the block (a portion in front of the fixed position of the spare tire 16).

In the embodiment, while the substantially U-shaped hook member 19 is used as the towing load receiving section, a shape of the towing load receiving section is not limited thereto. The towing load receiving section may have various shapes as long as the load from the towing rope can be received upon towing of the vehicle.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

EXPLANATION OF REFERENCES

10 Floor panel
11 Rear floor pan
16 Spare tire
18 Load support block
19 Hook member (towing load receiving section)
20 Floor pan reinforcement member
21 Front reinforcement block
22 Easy-deformable portion
23r Ridge portion
24 Reinforcement plate (restriction block)
24a Bulging portion (high rigidity portion)
40 Auxiliary bumper member

What is claimed is:

1. A vehicle body rear structure comprising:
   a rear floor pan on which a spare tire is disposed horizontally on the side of an upper surface and to which a central portion of the spare tire is fixed;
   a floor pan reinforcement member fixed to a lower surface of the rear floor pan; and
   a towing load receiving section protruding downward from a rear section of the rear floor pan via the floor pan reinforcement member,
   wherein the floor pan reinforcement member extends at least partially from a support position of the towing load receiving section toward a front side of a fixed position of the spare tire in a vehicle, and
   an easy-deformable portion with lower bending strength than front and rear regions is provided on a front side of the fixed position of the spare tire in a reinforcement region of the rear floor pan by the floor pan reinforcement member.

2. The vehicle body rear structure according to claim 1, wherein the floor pan reinforcement member includes:
   a load support block having a rear lower end to which the towing load receiving section is connected and a front end portion extending forward from the fixed position of the spare tire in the vehicle; and
   a front reinforcement block fixed to a position on the lower surface of the rear floor pan separated forward from the front end portion of the load support block, and a part of the rear floor pan between the load support block and the front reinforcement block constitutes the easy-deformable portion.

3. The vehicle body rear structure according to claim 2, wherein a ridge portion protruding upward is provided on the part of the rear floor pan between the load support block and the front reinforcement block in a vehicle width direction.

4. The vehicle body rear structure according to claim 2, wherein a restriction block configured to restrict excessive forward displacement of the front reinforcement block from a front side of the front reinforcement block of the rear floor pan as an origin is provided on the upper surface of the rear floor pan disposed in front of the front reinforcement block or the upper surface of the floor panel coupled to the front edge portion of the rear floor pan.

5. The vehicle body rear structure according to claim 4, wherein the restriction block has a high rigidity portion with higher rigidity than another area, which is provided in a central region in the vehicle width direction.

6. The vehicle body rear structure according to claim 1, wherein an auxiliary bumper member protruding backward from the towing load receiving section in the vehicle is attached to the rear section of the floor pan reinforcement member.

* * * * *